(12) United States Patent
Subramani (10) Patent No.: US 11,912,465 B2
(45) Date of Patent: Feb. 27, 2024

(54) LINER FOR FOOD RECEIVER OF FOOD HOLDING APPARATUS

(71) Applicant: Duke Manufacturing Co., St. Louis, MO (US)

(72) Inventor: Sai Ravi Krishna Subramani, Houston, TX (US)

(73) Assignee: DUKE MANUFACTURING CO., St. Louis, MO (US)

( * ) Notice: Subject to any disclaimer, the term of this patent is extended or adjusted under 35 U.S.C. 154(b) by 0 days.

(21) Appl. No.: 17/586,237

(22) Filed: Jan. 27, 2022

(65) Prior Publication Data

US 2022/0234785 A1 Jul. 28, 2022

Related U.S. Application Data

(60) Provisional application No. 63/142,127, filed on Jan. 27, 2021.

(51) Int. Cl.
*B65D 1/34* (2006.01)
*B65D 25/16* (2006.01)
*A47G 23/06* (2006.01)

(52) U.S. Cl.
CPC ............ *B65D 25/16* (2013.01); *A47G 23/06* (2013.01); *B65D 1/34* (2013.01)

(58) Field of Classification Search
CPC .......... A47J 39/02; A47J 39/006; A47J 39/26; B65D 1/34; B65D 21/0233; B65D 2581/3472; B65D 77/04; B65D 77/003; B65D 85/62; B65D 71/70
USPC ................. 206/557, 499; 220/657
See application file for complete search history.

(56) References Cited

U.S. PATENT DOCUMENTS

| | | | |
|---|---|---|---|
| 1,281,027 | A | 10/1918 | Kramer |
| 2,182,153 | A | 12/1939 | Kucher |
| 2,250,612 | A | 7/1941 | Tanner |
| 2,299,347 | A | 10/1942 | Rifkin |
| 2,445,470 | A | 7/1948 | Brauer |
| 2,546,417 | A | 3/1951 | Anglin |
| 2,637,178 | A | 5/1953 | Galazzi et al. |
| 2,814,185 | A | 11/1957 | Burg |
| 3,113,314 | A | 12/1963 | Yetter |
| 3,116,614 | A | 1/1964 | King |
| 3,308,633 | A | 3/1967 | Kritzer |
| 3,516,485 | A | 6/1970 | Rhoads et al. |

(Continued)

FOREIGN PATENT DOCUMENTS

| | | |
|---|---|---|
| CN | 202567851 | 12/2012 |
| CN | 111059851 A | 4/2020 |

(Continued)

OTHER PUBLICATIONS

2003 Flyer—Food Facilities Concepts, Inc., Preliminary Design Study, Cafeteria Renovation, Jun. 17, 2003, 1 page.

(Continued)

*Primary Examiner* — King M Chu
(74) *Attorney, Agent, or Firm* — Stinson LLP (57) ABSTRACT

Food holding system, liner thereof, and associated methods. A food tray receiver liner is configured to be installed in a food tray receiver. The liner is configured to collect food that may fall into the food tray receiver. Desirably, the liner obstructs food from passing between the liner and side walls of the food tray receiver.

25 Claims, 7 Drawing Sheets

(56) References Cited

U.S. PATENT DOCUMENTS

| | | |
|---|---|---|
| 3,780,794 A | 12/1973 | Staub |
| 3,797,563 A | 3/1974 | Hoffmann et al. |
| 3,897,989 A | 8/1975 | Grandi |
| 3,952,794 A | 4/1976 | Spanoudis |
| 3,965,969 A | 6/1976 | Williamson |
| 3,999,601 A | 12/1976 | Spanoudis |
| 4,005,745 A | 2/1977 | Colato et al. |
| 4,052,589 A | 10/1977 | Wyatt |
| 4,126,775 A | 11/1978 | Wyatt |
| 4,203,486 A | 5/1980 | Rubbright et al. |
| 4,235,285 A | 11/1980 | Johnson et al. |
| D261,715 S | 11/1981 | Daenen |
| 4,306,616 A | 12/1981 | Woods, Jr. et al. |
| 4,343,985 A | 8/1982 | Wilson et al. |
| 4,593,752 A | 6/1986 | Tipton |
| 4,685,311 A | 8/1987 | Rastelli |
| 4,856,579 A | 8/1989 | Wolfe |
| 4,884,626 A | 12/1989 | Filipowski |
| 4,898,091 A | 2/1990 | Rozak et al. |
| 4,997,030 A | 3/1991 | Goto et al. |
| 5,069,273 A | 12/1991 | O'Hearne |
| 5,086,693 A | 2/1992 | Tippmann et al. |
| 5,116,240 A | 5/1992 | Wischhusen et al. |
| D340,617 S | 10/1993 | Douglas |
| 5,363,672 A | 11/1994 | Moore et al. |
| 5,388,429 A | 2/1995 | Shackelford et al. |
| 5,404,935 A | 4/1995 | Liebermann |
| 5,423,449 A | 6/1995 | Gordon et al. |
| 5,449,232 A | 9/1995 | Westbrooks, Jr. et al. |
| 5,512,733 A | 4/1996 | Takikawa et al. |
| 5,551,774 A | 9/1996 | Campbell et al. |
| 5,598,886 A | 2/1997 | Criado-Mellado |
| 5,655,595 A | 8/1997 | Westbrooks, Jr. |
| 5,771,959 A | 6/1998 | Westbrooks, Jr. et al. |
| 5,782,174 A | 7/1998 | Cohn et al. |
| 5,895,104 A | 4/1999 | Grandi |
| 5,901,699 A | 5/1999 | McDermott |
| 5,910,210 A | 6/1999 | Violi et al. |
| 5,927,092 A | 7/1999 | Kushen et al. |
| 5,941,077 A | 8/1999 | Safyan |
| 5,947,012 A | 9/1999 | Ewald et al. |
| 5,954,984 A | 9/1999 | Ablah et al. |
| 5,961,866 A | 10/1999 | Hansen |
| 5,992,411 A | 11/1999 | Ayot et al. |
| 6,034,355 A | 3/2000 | Naderi et al. |
| 6,084,206 A | 7/2000 | Williamson et al. |
| 6,145,333 A | 11/2000 | Richmond et al. |
| 6,202,432 B1 | 3/2001 | Haasis |
| 6,220,338 B1 | 4/2001 | Grandi |
| 6,279,470 B2 | 8/2001 | Simeray et al. |
| 6,315,039 B1 | 11/2001 | Westbrooks et al. |
| 6,344,630 B1 | 2/2002 | Jarvis et al. |
| 6,347,526 B1 | 2/2002 | Ledbetter |
| 6,385,990 B1 | 5/2002 | Lee |
| 6,434,961 B2 | 8/2002 | Richmond et al. |
| 6,447,827 B1 | 9/2002 | Andersen |
| 6,539,846 B2 | 4/2003 | Citterio et al. |
| 6,561,317 B1 | 5/2003 | Dudley |
| 6,606,832 B2 | 8/2003 | Richardson et al. |
| 6,658,857 B1 | 12/2003 | George |
| 6,672,092 B2 | 1/2004 | Ruiz et al. |
| 6,735,971 B2 | 5/2004 | Monroe et al. |
| 6,774,346 B2 | 8/2004 | Clothier |
| 6,802,367 B1 | 10/2004 | Westbrooks, Jr. et al. |
| 6,817,201 B2 | 11/2004 | Yingst |
| 6,910,347 B2 | 6/2005 | Monroe et al. |
| 7,028,498 B2 | 4/2006 | Monroe et al. |
| 7,105,779 B2 | 9/2006 | Shei |
| 7,227,102 B2 | 6/2007 | Shei |
| RE40,151 E | 3/2008 | Shei et al. |
| D578,352 S | 10/2008 | Hauser |
| D601,382 S | 10/2009 | Ishida |
| 8,104,852 B2 | 1/2012 | Oh et al. |
| 8,171,845 B2 | 5/2012 | Hartsfield, Jr. et al. |
| 8,307,761 B1 | 11/2012 | Shackelford |
| 8,378,265 B2 | 2/2013 | Greenwood et al. |
| D687,268 S | 8/2013 | Difante |
| 8,661,970 B2 | 3/2014 | Shackelford |
| 8,997,640 B2 | 4/2015 | Hartsfield, Jr. et al. |
| 9,016,192 B2 | 4/2015 | Frauenfeld et al. |
| 9,089,210 B2 | 7/2015 | Kool |
| D767,940 S | 10/2016 | Gross et al. |
| D774,831 S | 12/2016 | Gebhardt et al. |
| 9,688,179 B2 | 6/2017 | White et al. |
| 9,795,253 B2 | 10/2017 | Shackelford |
| 9,962,037 B2 | 5/2018 | Magner |
| D871,155 S | 12/2019 | Miller et al. |
| D909,114 S | 2/2021 | Liao |
| D932,231 S | 10/2021 | Humphreys et al. |
| D960,649 S | 8/2022 | Ghiorghie |
| D961,333 S | 8/2022 | Zhong |
| 2002/0134545 A1 | 9/2002 | Cho et al. |
| 2002/0179131 A1 | 12/2002 | Johnson et al. |
| 2003/0080657 A1 | 5/2003 | Koopman |
| 2003/0108647 A1 | 6/2003 | Grandi |
| 2003/0154733 A1 | 8/2003 | Ruiz et al. |
| 2004/0020915 A1 | 2/2004 | Shei |
| 2004/0069766 A1 | 4/2004 | Haasis et al. |
| 2004/0237959 A1 | 12/2004 | Ashley |
| 2005/0023462 A1 | 2/2005 | Rosenman et al. |
| 2005/0217298 A1 | 10/2005 | Monroe et al. |
| 2005/0255208 A1 | 11/2005 | Shei |
| 2006/0081627 A1* | 4/2006 | Shei ............... A47J 36/2483 219/771 |
| 2006/0162908 A1 | 7/2006 | Tippmann |
| 2006/0201177 A1 | 9/2006 | Spillner |
| 2007/0210055 A1 | 9/2007 | Konrad |
| 2008/0025462 A1 | 1/2008 | Shei et al. |
| 2008/0185390 A1 | 8/2008 | Liebzeit |
| 2008/0283440 A1 | 11/2008 | Hartsfield, Jr. et al. |
| 2010/0293979 A1 | 11/2010 | Shei et al. |
| 2010/0301034 A1 | 12/2010 | Greenwood et al. |
| 2011/0277644 A1 | 11/2011 | Frauenfeld et al. |
| 2013/0037237 A1 | 2/2013 | Shackelford |
| 2014/0131006 A1 | 5/2014 | Shackelford |
| 2015/0068038 A1 | 3/2015 | Iovanel |
| 2015/0136633 A1* | 5/2015 | Sarnoff ............. A47J 36/2405 206/499 |
| 2015/0173526 A1 | 6/2015 | Delgadillo |
| 2017/0079476 A1 | 3/2017 | Fortmann et al. |
| 2017/0082354 A1 | 3/2017 | Lintker et al. |
| 2017/0328958 A1 | 11/2017 | Bohn et al. |
| 2018/0014635 A1 | 1/2018 | Turner et al. |
| 2018/0160854 A1 | 6/2018 | Jennings et al. |
| 2018/0299024 A1 | 10/2018 | Matsuzaki et al. |
| 2018/0299192 A1 | 10/2018 | Clark et al. |
| 2018/0333006 A1 | 11/2018 | Bassill et al. |
| 2019/0075970 A1 | 3/2019 | Patterson et al. |
| 2019/0254453 A1 | 8/2019 | Holler et al. |
| 2019/0290073 A1* | 9/2019 | Veltrop ............... A47J 43/28 |
| 2020/0046170 A1 | 2/2020 | Veltrop |
| 2021/0348836 A1 | 11/2021 | Lauchnor |
| 2022/0095837 A1 | 3/2022 | Bigott et al. |
| 2022/0233023 A1 | 7/2022 | Stettes et al. |
| 2022/0234785 A1 | 7/2022 | Subramani |
| 2023/0000246 A1 | 1/2023 | Boudreault |
| 2023/0007803 A1 | 1/2023 | Song et al. |

FOREIGN PATENT DOCUMENTS

| | | |
|---|---|---|
| DE | 19757004 | 7/1999 |
| DE | 10061201 | 6/2002 |
| EP | 3795042 A1 | 3/2021 |
| FR | 2605395 | 4/1988 |
| FR | 2652885 A1 | 4/1991 |
| FR | 2759890 | 8/1998 |
| JP | H0546863 A | 2/1993 |
| JP | 2001190338 A | 7/2001 |
| JP | 2002517265 A | 6/2002 |
| JP | 2003-3369 A | 1/2003 |
| JP | 2003070575 | 3/2003 |
| JP | 2003336956 A | 11/2003 |
| JP | 3776274 B2 | 5/2006 |
| JP | 2008025920 | 2/2008 |

(56) References Cited

FOREIGN PATENT DOCUMENTS

| | | |
|---|---|---|
| JP | 2008029365 A | 2/2008 |
| JP | 2010236808 A | 10/2010 |
| JP | 4762814 B2 | 8/2011 |
| KR | 20050026599 | 3/2005 |
| KR | 20050031783 | 4/2005 |
| KR | 20050026600 | 3/2015 |
| WO | WO199416607 | 8/1994 |
| WO | WO199733130 | 9/1997 |
| WO | WO199837797 | 9/1998 |
| WO | WO199853260 | 11/1998 |
| WO | WO200071950 | 11/2000 |
| WO | WO2003034882 | 5/2003 |
| WO | WO2006087012 | 8/2006 |
| WO | WO2007063294 | 6/2007 |
| WO | WO-2008021492 A2 * | 2/2008 ............. A01K 1/031 |
| WO | WO2008127330 | 10/2008 |
| WO | 2010/133504 A2 | 11/2010 |
| WO | WO2010151456 | 12/2010 |
| WO | 2022263840 A1 | 12/2022 |

OTHER PUBLICATIONS

Atlas Metal Industries, Inc., _Mobile Cold Serving Unit_, Model No. BLC-4-RM, Oct. 2004, 2 Pgs.
Atlas Metal Industries, Inc., _Mobile Hot Serving Unit_, Model No. BLH-4, Mar. 2001, 2 Pgs.
Barker Sales, _ QCF Series—Self-Service Drop-In Merchandiser_, Model Nos. QCF-3, -4, -5, -6, and -8, May 2007, 2 pgs.
Corrected IPR Petition Against U.S. Pat. No. 8,701,554, dated Jun. 12, 2015, 66 pages.
Declaration of Dr. J. Rhett Mayor in Support of Preliminary Injunction Re. U.S. Pat. Nos. 8,307,761, 8,661,970, and 9,795,253, dated Aug. 20, 2020, 335 pages.
Defendant Commercial Kitchens, Inc. Original Answer, Affirmative Defenses, and Counterclaim to Complaint Re. Infringement of U.S. Pat. No. 8,701,554, dated Nov. 18, 2014, 8 pages.
Delfield Co. Answer to Complaint and Counterclaim Re. Infringement of U.S. Pat. No. 8,997,640, dated Jan. 31, 2023, 29 pages.
Deposition of J. Rhett Mayor, Mar. 5, 2021, 135 pages.
Duke Manufacturing Co. Corrected Opening Brief on Appeal Re. U.S. Pat. Nos. 8,307,761, 8,661,970, and 9,795,253, dated Aug. 10, 2021, 148 pages.
Duke Manufacturing Co. Demonstrative Exhibits for the IPRs Re. U.S. Pat. Nos. 8,307,761, 8,661,970, and 9,795,253, dated Apr. 7, 2022, 127 pages.
Low Temp. Industries Demonstrative Exhibits for the IPRs Re. U.S. Pat. Nos. 8,307,761, 8,661,970, and 9,795,253, dated Apr. 7, 2022, 61 pages.
Duke Manufacturing Co. Memorandum in Support of its Motion for Partial Summary Judgment Re. U.S. Pat. Nos. 8,307,761, 8,661,970, and 9,795,253, dated Nov. 18, 2021, 30 pages.
Duke Manufacturing Co. Memorandum Re. its Motion to Amend its Preliminary Invalidity Contentions Re. U.S. Pat. Nos. 8,307,761, 8,661,970, and 9,795,25, dated Jul. 23, 2021 11 pages.
Duke Manufacturing Co. Motion for Partial Summary Judgment Re. U.S. Pat. Nos. 8,307,761, 8,661,970, and 9,795,253, Nov. 18, 2021, 7 pages.
Duke Manufacturing Co. Preliminary Reply in the IPR Re. U.S. Pat. No. 8,307,761, dated May 19, 2021, 15 pages.
Duke Manufacturing Co. Preliminary Reply in the IPR Re. U.S. Pat. No. dated 8,661,970, May 19, 2021, 15 pages.
Duke Manufacturing Co. Preliminary Reply in the IPR Re. U.S. Pat. No. 9,795,253, dated May 19, 2021, 15 pages.
Duke Manufacturing Co. Reply Brief on Appeal Re. U.S. Pat. Nos. 8,307,761, 8,661,970, and 9,795,253, dated Sep. 13, 2021, 39 pages.
Duke Manufacturing Co. Reply in Support of its Motion for Partial Summary Judgment Re. U.S. Pat. Nos. 8,307,761, 8,661,970, and 9,795,253, dated Jan. 10, 2022 27 pages.
Duke Manufacturing Co. Reply in the IPR Re. U.S. Pat. No. 8,307,761, dated Jan. 27, 2022 48 pages.
Duke Manufacturing Co. Reply in the IPR Re. U.S. Pat. No. 8,661,970, dated Jan. 27, 2022 48 pages.
Duke Manufacturing Co. Reply in the IPR Re. U.S. Pat. No. 9,795,253, dated Jan. 27, 2022 48 pages.
Duke Manufacturing Co. Stipulation of Invalidity Contentions Re. U.S. Pat. Nos. 8,307,761, 8,661,970, and 9,795,253, dated Apr. 30, 2021, 5 pages.
Duke Manuefacturing Co. Sur Reply in Opposition to Preliminary Injunction Re. U.S. Pat. Nos. 8,307,761, 8,661,970, and 9,795,253, dated Mar. 12, 2021, 43 pages.
Duke MFG. Co., _2006 Standard Products Price Book_, 2 pgs. Including Cover Page and p. 115_ Admitted Prior Art, (Applicants points out in the information disclosure statement that the year of publication is sufficiently earlier than the effective U.S. filing date and any foreign priority date so that the particular month of publication is not in issue, per MPEP 37 CFR 1.98(b)).
Expert Declaration of Dr. J. Rhett Mayor Re. The Validity of U.S. Pat. Nos. 8,307,761, 8,661,970, and 9,795,253, dated Apr. 22, 2021, 8 pages.
Expert Declaration of J. Rhett Mayor Re. Validity of U.S. Pat. No. 8,307,761, dated Oct. 21, 2020, 148 pages.
Expert Declaration of J. Rhett Mayor Re. Validity of U.S. Pat. No. 8,661,970, dated Oct. 21, 2020, 158 pages.
Expert Declaration of J. Rhett Mayor Re. Validity of U.S. Pat. No. 9,795,253, dated Oct. 21, 2020, 149 pages.
Expert Declaration of Kelly Homan Re. Invalidity of U.S. Pat. No. 8,307,761, dated Jan. 11, 2021, 200 pages.
Expert Declaration of Kelly Homan Re. Invalidity of U.S. Pat. No. 8,661,970, dated Jan. 11, 2021, 228 pages.
Expert Declaration of Kelly Homan Re. Invalidity of U.S. Pat. No. 9,795,253, dated Jan. 11, 2021, 195 pages.
Expert Declaration of Kelly Homan Re. Invalidity of U.S. Pat. Nos. 8,307,761, 8,661,970, and 9,795,253, dated Mar. 12, 2021, 241 pages.
Expert Report of Dr. J. Rhett Mayor Re. U.S. Pat. Nos. 8,307,761, 8,661,970, and 9,795,253, dated Sep. 23, 2021, 214 pages.
Expert Report of Kelly Homan Re. The Invalidity of U.S. Pat. No. 8,307,761, dated Sep. 23, 2020, 289 pages.
Expunged Corrected Inter Partes Review Petition Against U.S. Pat. No. 8,701,554, dated Jun. 8, 2015, 65 pages.
Feb. 16, 2022 Deposition of Kelly Homan, 98 pages.
Federal Circuit Decision Reversing the Preliminary Injunction Re. U.S. Pat. Nos. 8,307,761, 8,661,970, and 9,795,253, dated Dec. 28, 2021, 15 pages.
Final Written Decision in the IPR Re. U.S. Pat. No. 8,307,761, dated Jul. 6, 2022, 53 pages.
Final Written Decision in the IPR Re. U.S. Pat. No. 8,661,970, dated Jul. 6, 2022, 56 pages.
Final Written Decision in the IPR Re. U.S. Pat. No. 9,795,253, dated Jul. 15, 2022, 56 pages.
Flexible Heaters, 2014, (Applicant points out in the information disclosure statement that the year of publication is sufficiently earlier than the effective U.S. filing date and any foreign priority date so that the particular month of publication is not in issue, per MPEP 37 CFR 1.98(b)).
Flyer 1 Complete, _Bring Your Lunchroom to Life_, 2002-2003, 8 Pgs. (Applicants points out in the information statement that the year of publication is sufficiently earlier than the effective U.S. filing date and any foreign priority date so that the particular month of publication is not in issue, per MPEP 37 CFR 1.98(b)).
Flyer 2 Complete, _Bring Your Lunchroom to Life_, 2003-2004, 8 Pgs. (Applicants points out in the information disclosure statement that the year of publication is sufficiently earlier than the effective U.S. filing date and any foreign priority date so that the particular month of publication is not in issue, per MPEP 37 CFR 1.98(b)).
Hatco Corporation, _GLO-Ray Designer Merchandising WARMERS_, Model Nos. GR2SDH and GR2SDS, Undated, 2 Pgs.
Hatco Corporation, _GLO-Ray Pizza WARMERS_, Model Nos. GRPWS Series, 2 Pgs.
Hatco Glo-Ray Operator_S Manual, Jul. 2012, 24 pages.
How a Silicone Heating Pad Works, Feb. 11, 2021, 5 pages.
Institution Decision in the IPR Re. U.S. Pat. No. 8,307,761, dated Jul. 9, 2021, 35 pages.

(56) References Cited

OTHER PUBLICATIONS

Institution Decision in the IPR Re. U.S. Pat. No. 8,661,970, dated Jul. 9, 2021, 39 pages.
Institution Decision in the IPR Re. U.S. Pat. No. 9,795,253, dated Jul. 20, 2021, 44 pages.
Inter Partes Review Petition Against U.S. Pat. No. 8,307,761, dated Jan. 12, 2021, 118 pages.
Inter Partes Review Petition Against U.S. Pat. No. 8,661,970, dated Jan. 12, 2021, 129 pages.
Inter Partes Review Petition Against U.S. Pat. No. 9,795,253, dated Jan. 12, 2021, 134 pages.
Invalidity Contentions for U.S. Pat. No. 8,307,761—Part 1, dated Mar. 12, 2021, 500 pages.
Invalidity Contentions for U.S. Pat. No. 8,307,761 based on Duke Heritage Buffet, dated Jul. 23, 2021, 76 pages.
Invalidity Contentions for U.S. Pat. No. 8,307,761 based on Finegan, dated Dec. 11, 2020, 87 pages.
Invalidity Contentions for U.S. Pat. No. 8,307,761 based on Load King Diamond Bar, dated Jul. 23, 2021, 114 pages.
Invalidity Contentions for U.S. Pat. No. 8,307,761 based on Richmond, dated Dec. 11, 2020, 88 pages.
Invalidity Contentions for U.S. Pat. No. 8,307,761 based on Shackelford, dated Dec. 11, 2020, 27 pages.
Invalidity Contentions for U.S. Pat. No. 8,661,970 based on Duke Heritage Buffet, dated Jul. 23, 2021, 188 pages.
Invalidity Contentions for U.S. Pat. No. 8,661,970 based on Finegan, dated Dec. 11, 2020, 224 pages.
Invalidity Contentions for U.S. Pat. No. 8,661,970 based on Load King Diamond Bar, dated Jul. 23, 2021, 242 pages.
Invalidity Contentions for U.S. Pat. No. 8,661,970 based on Richmond, dated Dec. 11, 2020, 207 pages.
Invalidity Contentions for U.S. Pat. No. 8,661,970 based on Shackelford, dated Dec. 11, 2020, 26 pages.
Invalidity Contentions for U.S. Pat. No. 9,795,253 based on Duke Heritage Buffet, dated Jul. 23, 2021, 98 pages.
Invalidity Contentions for U.S. Pat. No. 9,795,253 based on Finegan, dated Dec. 11, 2020, 122 pages.
Invalidity Contentions for U.S. Pat. No. 9,795,253 based on Load King Diamond Bar, dated Jul. 23, 2021, 165 pages.
Invalidity Contentions for U.S. Pat. No. 9,795,253 based on Richmond, dated Dec. 11, 2020, 146 pages.
Invalidity Contentions for U.S. Pat. No. 9,795,253 based on Shackelford, dated Dec. 11, 2020, 21 pages.
Invalidity Contentions for U.S. Pat. No. 8,307,761—Part 2, dated Mar. 12, 2021, 449 pages.
Jul. 8, 2021 Deposition of Dennis Finegan, 120 pages.
Jun. 25, 2021 Deposition of Alvis Hartsfield, 130 pages.
Kitchen Equipment Fabricating Co. Answer to Counterclaim Re. Infringement of U.S. Pat. No. 8,701,554, dated Dec. 11, 2014, 5 pages.
Low Temp Indus. Corrected Responsive Brief on Appeal Re. U.S. Pat. Nos. 8,307,761, 8,661,970, and 9,795,253, dated dated Sep. 7, 2021, 77 pages.
Low Temp Indus. Preliminary Response in the IPR Re. U.S. Pat. No. 8,661,970, dated Apr. 22, 2021, 71 pages.
Low Temp Indus. Preliminary Response in the IPR Re. U.S. Pat. No. 9,795,253, dated Apr. 28, 2021, 73 pages.
Low Temp Indus. Preliminary Response in the IPR Re. U.S. Pat. No. 8,307,761, dated Apr. 22, 2021, 69 pages.
Low Temp Indus. Preliminary Sur Reply in the IPR Re. U.S. Pat. No. 8,307,761, dated May 26, 2021, 15 pages.
Low Temp Indus. Preliminary Sur Reply in the IPR Re. U.S. Pat. No. 8,661,970, dated May 26, 2021 15 pages.
Low Temp Indus. Preliminary Sur Reply in the IPR Re. U.S. Pat. No. 9,795,253, dated May 26, 2021, 16 pages.
Low Temp Indus. Response for Preliminary Injunction Re. U.S. Pat. Nos. 8,307,761, 8,661,970, and 9,795,253, dated Apr. 2, 2021, 41 pages.
Low Temp Indus. Response in the IPR Re. U.S. Pat. No. 8,307,761, dated Oct. 21, 2021, 81 pages.
Low Temp Indus. Response in the IPR Re. U.S. Pat. No. 8,661,970, dated Oct. 21, 2021, 81 pages.
Low Temp Indus. Response in the IPRR Re. U.S. Pat. No. 9,795,253, dated Oct. 21, 2021, 70 pages.
Low Temp Indus. Sur Reply in the IPR Re. U.S. Pat. No. 8,307,761, dated Mar. 3, 2022, 38 pages.
Low Temp Indus. Sur Reply in the IPR Re. U.S. Pat. No. 8,661,970, dated Mar. 3, 2022, 38 pages.
Low Temp Indus. Sur Reply in the IPR Re. U.S. Pat. No. 9,795,253, dated Mar. 3, 2022, 38 pages.
Low Temp. Industries Reply in Support of its Motion for Preliminary Injunction Re. U.S. Pat. Nos. 8,307,761, 8,661,970, and 9,795,253, dated Oct. 12, 2020, 37 pages.
Mar. 23, 2021 Deposition of Kelly Homan, 90 pages.
Oct. 1, 2021 Deposition of Kelly Homan, 245 pages.
Order Granting Motion for Preliminary Injunction Re. U.S. Pat. Nos. 8,307,761, 8,661,970, and 9,795,253, dated Jun. 25, 2021, 40 pages.
Original Inter Partes Review Petition Against U.S. Pat. No. 8,701,554, dated Mar. 16, 2015, 6 pages.
Preliminary Injunction Hearing Transcript, Apr. 19, 2021, 289 pages.
Prosecution History of U.S. Pat. No. 8,171,845, dated Dec. 29, 2014, 438 pages.
Prosecution History of U.S. Pat. No. 8,701,554, dated Aug. 6, 2015, 275 pages.
Prosecution History of U.S. Pat. No. 8,997,640, dated May 24, 2016, 322 pages.
Rebuttal Report of Dr. J. Rhett Mayor Re. Validity of U.S. Pat. Nos. 8,307,761, 8,661,970, and 9,795,253, dated Nov. 8, 2021, 177 pages.
Second Declaration of Dr. J. Rhett Mayor in Support of Preliminary Injunction Re. U.S. Pat. Nos. 8,307,761, 8,661,970, and 9,795,253, dated Oct. 12, 2020, 61 pages.
Second Expert Declaration of Kelly Homan Re. Invalidity of U.S. Pat. No. 8,307,761, dated Jan. 27, 2022, 74 pages.
Second Expert Declaration of Kelly Homan Re. Invalidity of U.S. Pat. No. 8,661,970, dated Jan. 27, 2022, 79 pages.
Second Expert Declaration of Kelly Homan Re. Invalidity of U.S. Pat. No. 9,795,253, dated Jan. 27, 2022, 72 pages.
Supplemental Expert Declaration of Kelly Homan Re. Invalidity of U.S. Pat. Nos. 8,307,761, 8,661,970, and 9,795,253, dated Mar. 12, 2021, 75 pages.
Supplemental Declaration of Kelly Homan in Opposition of Preliminary Injuction Re. U.S. Pat. Nos. 8,307,761, 8,661,970, and 9,795,253, dated Mar. 12, 2021, 75 pages.
The Delfield Company, _F5 Serview Drop in—30_ Deep Mirrored Self-Contained Refrigerated Display Cases_, Jan. 2004, 2 pages.
The Delfield Company, _Mobile Ice Pan Serving Counters_, Shelleyglas, Model KCI and KCI-NU, May 2007, 2 pages.
Third Declaration of Dr. J. Rhett Mayor in Support of Preliminary Injunction Re. U.S. Pat. Nos. 8,307,761, 8,661,970, and 9,795,253, dated Apr. 2, 2021, 19 pages.
Wayback Machine Describing Glo-Ray Headed Shelves, 4_10_04, Oct. 6, 2014, 2 Pgs.
Duke Manufacturing Co. Hot-Cold Convertible Unit Drop In, 2010, 2 pages (Applicant points out in the information disclosure statement that the year of publication is sufficiently earlier than the effective U.S. filing date so that the particular month of publication is not in issue, per MPEP 37 CFR 1.98(b)).
Duke Manufacturing Co. HB3-1H2C Heritage Buffet—Hot-Cold Cold Pan, Sep. 26, 2019, 2 pages.
Duke Manufacturing Co. E303SW Aerohot Foodservice Hot Food Units—Electric—Sealed Wells, May 2011, 2 pages.
Duke Manufacturing Co. E303-25 AeroSery Serving Systems—Hot Food Units—Electric, Jun. 2008, 2 pages.
Duke Manufacturing Co. E-3-CBSS Thurmaduke Steamtables Hot Food Units—Electric—Standard, Jun. 2008, 2 pages.
Duke Manufacturing Co. Drop Ins, 2010, 4 pages, (Applicant points out in the information disclosure statement that the year of publication is sufficiently earlier than the effective U.S. filing date so that the particular month of publication is not in issue, per MPEP 37 CFR 1.98(b)).

(56) References Cited

OTHER PUBLICATIONS

Duke Manufacturing Co. ADI-3E-SW Hot Food Electric—Sealed Well—Drop in, May 2022, 2 pages.
Duke Manufacturing Co. 304-25PG AeroServ Serving Systems—Hot Food Units—Gas, Oct. 2008, 2 pages.
Duke Manufacturing Co. 212-ADI3HC Hot-Cold Convertible Unit Drop In, Jan. 2015, 2 pages.
Declaration of James Bigott Re. Commercial Product Embodied by U.S. Pat. Nos. 8,307,761, 8,661,970, and 9,795,253, dated Sep. 23, 2021, 85 pages.
American National Standard/NSF International Standard, "Commercial refrigerators and freezers," Commercial Refrigerator Manufacturers Association, NSF/ANSI 7—2007, 48 pages.
Delfield, "FlexiWell—Mobile hot and cold combination serving counters," Welbilt, 4 pages.
Duke Manufacturing Co. Specifications, "ADI-2-6HC Drop in Hot and Cold Pan," F.O.B. Sedalia, Missouri, 2 pages.
Duke Manufacturing Co. Specifications, "AeroHot FoodService—Hot Food Units—Electric—Sealed Wells," Catalog No. AFS—ELECSW, A.I.A. File No. 35-C-13, F.O.B Sedalia, Missouri, 2 pages.
Duke Manufacturing Co. Specifications, "AeroServ—Serving Systems—Hot Food Units—Electric," Catalog No. ASC-ELECHOT, A.I.A. File No. 35-C-13, F.O.B Sedalia, Missouri, 2 pages.
Duke Manufacturing Co. Specifications, "AeroServ—Serving Systems—Hot Food Units—Gas," Catalog No. ASC-GASHOT, A.I.A. File No. 35-C-13, F.O.B Sedalia, Missouri, 2 pages.
Duke Manufacturing Co. Specifications, "Drop-In—Hot Food—Electric ," Catalog No. ASC-GASHOT, A.I.A. File No. 35-C-13, F.O.B Sedalia, Missouri, 2 pages.
Duke Manufacturing Co. Specifications, "Thurmaduke™Steamtables—Hot Food—Electric—Standard," Catalog No. TST-STELECHOT, A.I.A. File No. 35-C-13, F.O.B Sedalia, Missouri, 2 pages.
Food Safety, "It's Everyone's Business," Country of Santa Clara, Department of Environmental Health, Consumer Protection Division, 5th Edition, dated Jul. 2008, 55 pages.
G.A. Systems, Inc., "Hot Cold Dual Operation Drop in," Specification Sheet, 2 pages.
Low Temp Industries, "QuickSwitch Series—Drop In CHP-X Units," Operation/Maintenance Manual, Custom Fabricators of Foodservice Equipment, Jonesboro, GA, 26 pages.
Rhode Island Department of Health, "Potentially Hazardous Food Temperatures," Office of Food Protection, revision dated Nov. 2207, URL: <www.health.ri.gov>.
State of Connecticut: Department of Public Health, "Compliance Guide for the Food Service Inspection Form," Bureau of Regulatory Services, Division of Environmental Health, Food Protection Program, Hartford CT, revision dated Dec. 2007, 45 pages.
Strollerderby, "From Ice Box to Sub-Zero: the Evolution of the Kitchen From 1900-2012 (Photos)," available on or before Nov. 16, 2012, via Internet Archive: Wayback Machine URL <https://web.archive.org/web/20121116004949/http://blogs.babble.com/strollerderby/2012/11/12/from-ice-box-to-sub-zero-the-evolution-of-the-kitchen-from-1900-2012-photos/#close>, retrieved on Nov. 22, 2021, 6 pages.
The Vollrath Company LLC, "1 Well, 2 Well. 3 Well. And 4 Well Hot/Cold Drop-In (NSF7 Cold Food Holding and NSF4 Hot Food Holding)," Operator's Manual for Item No. 2350245-1, dated Apr. 29, 2015, 5 pages.
The Vollrath Company LLC, "Hot/Cold Well Modular Drop-ins (NSF7 Cold Food Holding and NSF4 Hot Food Holding)," Operations Manual for Part No. 351818-1, dated Jan. 30, 2019, 12 pages.

\* cited by examiner

LINER FOR FOOD RECEIVER OF FOOD HOLDING APPARATUS

CROSS-REFERENCE TO RELATED APPLICATION

The present application claims priority to U.S. Provisional Application No. 63/142,127, filed on Jan. 27, 2021, the entirety of which is hereby incorporated by reference.

FIELD

The present disclosure generally relates to liners for food handling equipment and more particularly to a liner for food holding apparatuses.

BACKGROUND

Food holding apparatuses, such as countertop food holding apparatuses, are commonly used in restaurants and kitchens, such as part of a buffet or serving line, to hold prepared food at a set temperature before the food is served to a consumer.

SUMMARY

In one aspect, a liner is for a food tray receiver of a food holding apparatus. The food tray receiver has a plurality of food tray receiver side walls defining a food tray receiver cavity for receiving one or more trays of food. The liner comprises a flexible body sized and shaped to be inserted into the food tray receiver cavity of the food tray receiver. The flexible body has a base and a plurality of body side walls extending generally upward from the base. The flexible body has a food receiving cavity defined by the base and the plurality of body side walls. The food receiving cavity has an open top configured to receive food when the flexible body is disposed in the food tray receiver and food falls toward the flexible body. The body side walls are configured to move into engagement with the food tray receiver side walls to generally prevent food from moving between the food tray receiver side walls and the body side walls when the flexible body is disposed in the food tray receiver cavity of the food tray receiver.

In another aspect, a method includes using a liner with a food tray receiver of a food holding apparatus. The food tray receiver has a floor and a plurality of food tray receiver side walls defining a food tray receiver cavity for receiving one or more trays of food. The method comprises placing the liner in the food tray receiver cavity. The liner comprises a flexible body sized and shaped to be inserted into the food tray receiver cavity of the food tray receiver. The flexible body has a base and a plurality of body side walls extending generally upward from the base. The flexible body has a food receiving cavity defined by the base and the plurality of side walls. The food receiving cavity has an open top configured to receive food when the flexible body is disposed in the food tray receiver and food falls toward the flexible body. The method includes forming a seal between the side walls of the flexible body and the food tray receiver side walls to generally prevent food from moving between the food receiver side walls and the body side walls.

In another aspect, a liner is for a food tray receiver of a food holding apparatus. The food tray receiver has a plurality of food tray receiver side walls defining a food tray receiver cavity for receiving one or more trays of food. The liner comprises a flexible body sized and shaped to be inserted into the food tray receiver cavity of the food tray receiver. The flexible body has a base and a plurality of body side walls extending generally upward from the base. The flexible body has a food receiving cavity defined by the base and the plurality of body side walls. The food receiving cavity has an open top configured to receive food when the flexible body is disposed in the food tray receiver and food falls toward the flexible body. The body side walls are configured to engage the food tray receiver side walls when received in the food tray receiver cavity to obstruct food from moving between the food tray receiver side walls and the body side walls. The body side walls taper outward as the body side walls extend generally upward away from the base.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
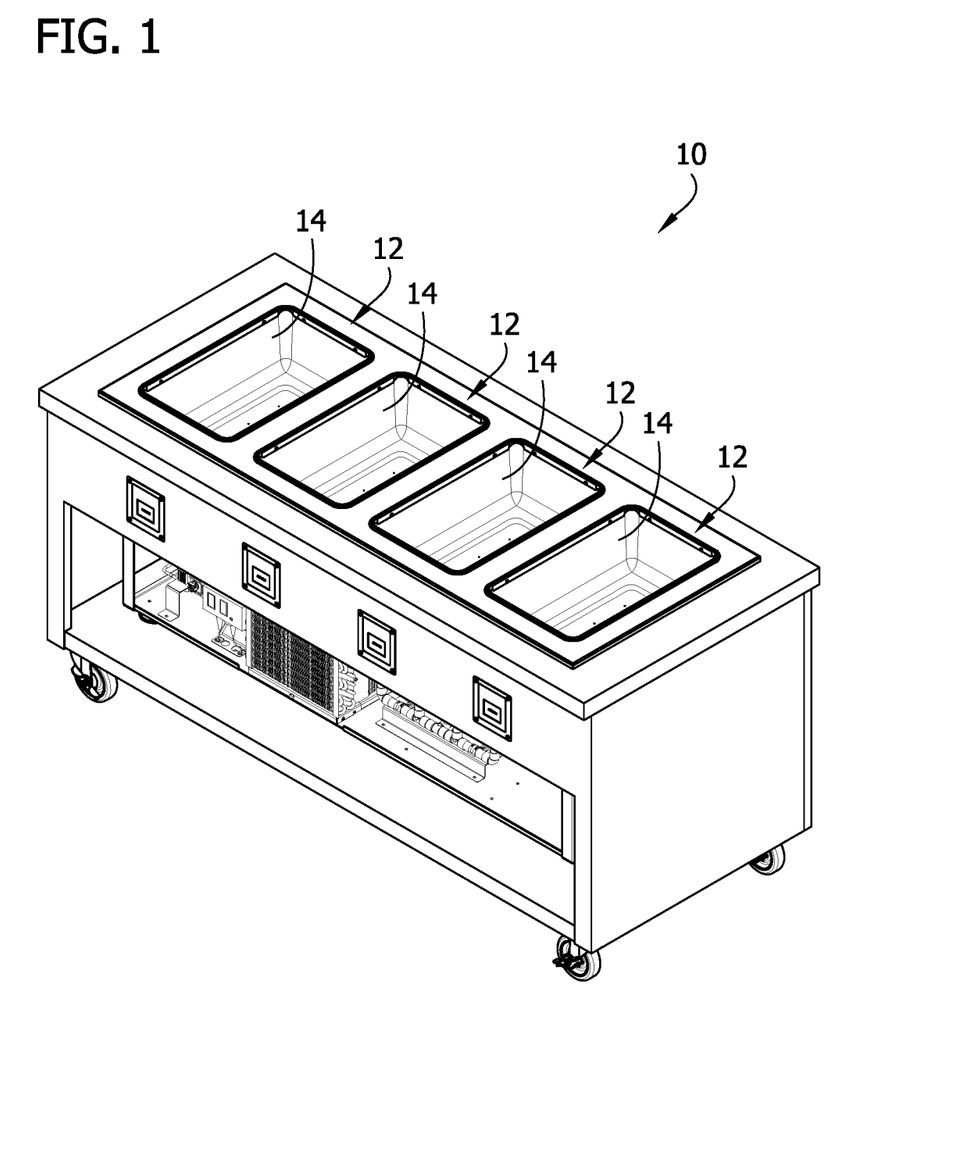
FIG. 1 is a perspective of a food holding apparatus.

Referring to the drawings, FIG. 1 illustrates a food holding apparatus 10. The food holding apparatus 10 is used to hold trays of prepared or ready to serve food at set (e.g., hot or cold) temperatures. The food holding apparatus 10 includes one or more food receivers 12, sometimes referred to as food holding wells or pans. The food receivers 12 may be referred to as food tray receivers. In the illustrated embodiment, the food holding apparatus 10 includes four food receivers 12, with each of the food receivers being generally identical. The food receivers 12 receive and hold the trays of food (not shown). For example, a food tray may have an upper flange by which the tray "hangs" down into the food receiver 12. The food holding apparatus 10 may include a heating system and/or cooling system for heating and/or cooling each food receiver 12 and the one or more trays of food received and held therein. The heating system (not shown) may include a heater, such as an electrical resistance heater, underlying a floor of each food receiver 12. The cooling system may include a refrigeration system with one or more cooling coils (e.g., cooling conduit extending around the food receiver). Such a heater and cooling coils may each be broadly referred to as a food receiver temperature conditioning element. One or both of the heater or cooling coil may be omitted without departing from the scope of the present disclosure. Further details on an example food holding apparatus may be found in U.S. patent application Ser. No. 17/448,899, filed Sep. 27, 2021, the entirety of which is hereby incorporated by reference.

Figure 2:
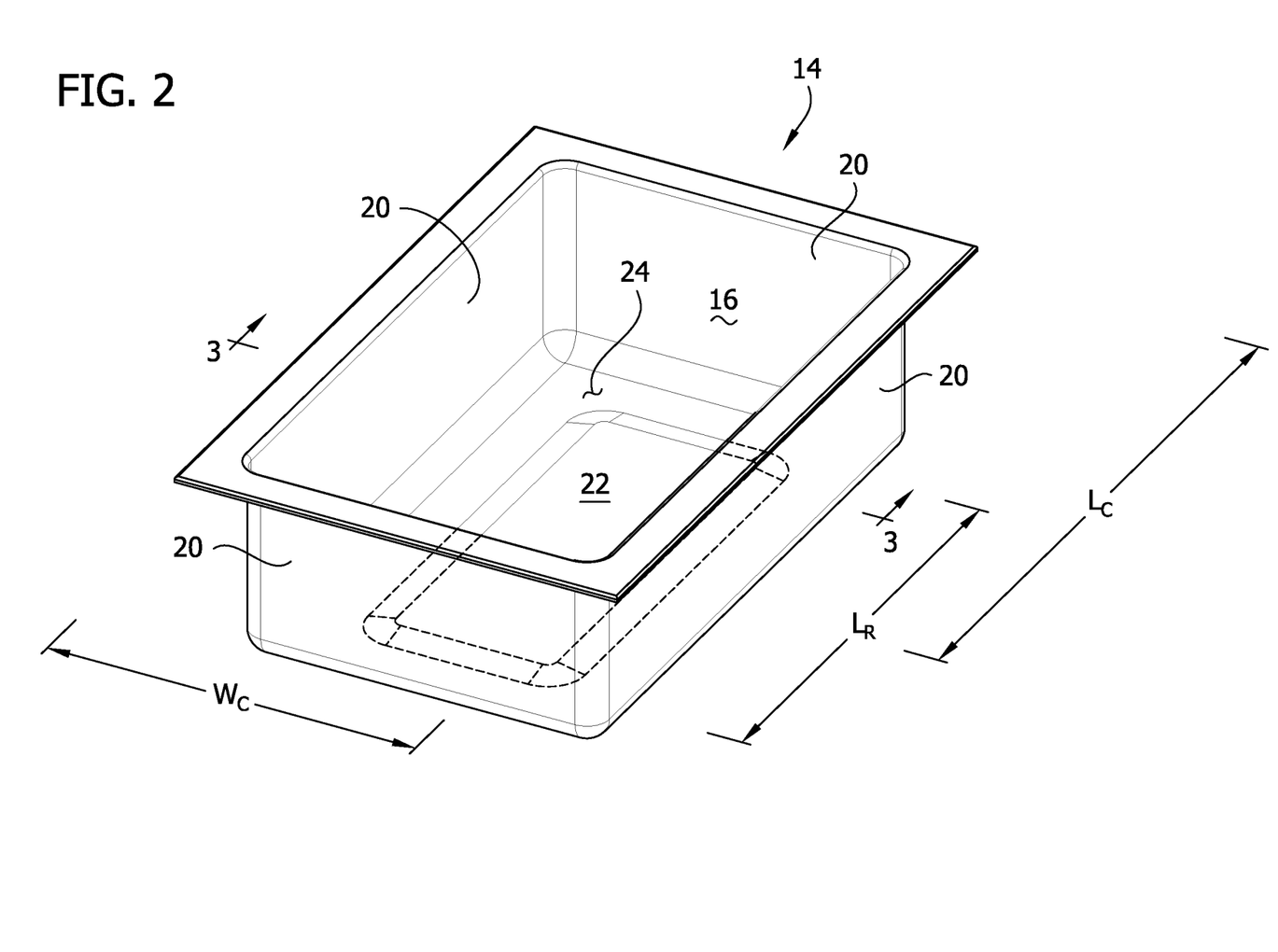
FIG. 2 is a perspective of a food receiver pan of a food receiver of the food holding apparatus.
Figure 3:
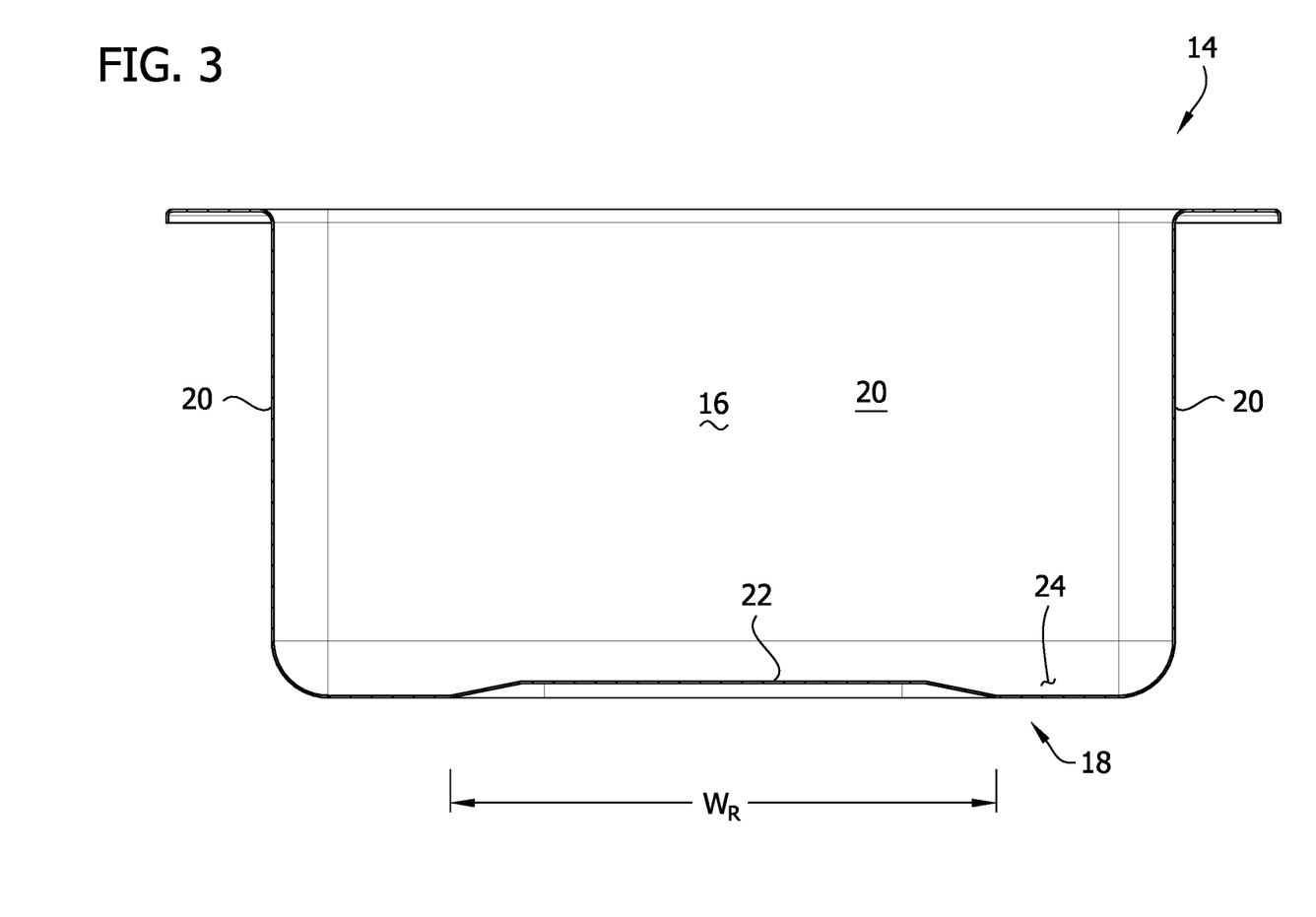
FIG. 3 is a cross section of the food receiver pan taken through line 3-3 of FIG. 2.

Referring to FIGS. 2 and 3, each food receiver 12 includes a food receiver pan 14. The food receiver pan 14 defines a food receiver cavity 16 in which the one or more trays of food are receivable. The food receiver cavity 16 can be sized and shaped to receive one or more of generally any size of food tray (sometimes also referred to as food pans) such as a full size food tray (about 20.75"×12.75"), a two-thirds size food tray (about 13.75"×12/75"), a half size food tray (about 12.75"×10.375"), a one-third size food tray (about 12.75"×6.875"), etc. The food receiver pan 14 includes a floor 18 and a plurality (e.g., four) food receiver side walls 20 extending upward from the floor. The floor 18 includes a centrally located raised portion or plateau 22 spaced inward from the food receiver side walls 20. The food receiver pan 14 includes a perimeter or peripheral recess or trough 24 extending around the raised portion 22, between the raised portion and the food receiver side walls 20. The side walls 20 intersect or join with each other at the corners of the food receiver cavity 16. In the illustrated embodiment, the corners of the food receiver pan 14 defined by the intersections of the food receiver side walls 20 are rounded or curved. Other configurations of the food holding apparatus 10 and the food receivers 12 can be used without departing from the scope of the present disclosure.

Figure 4:
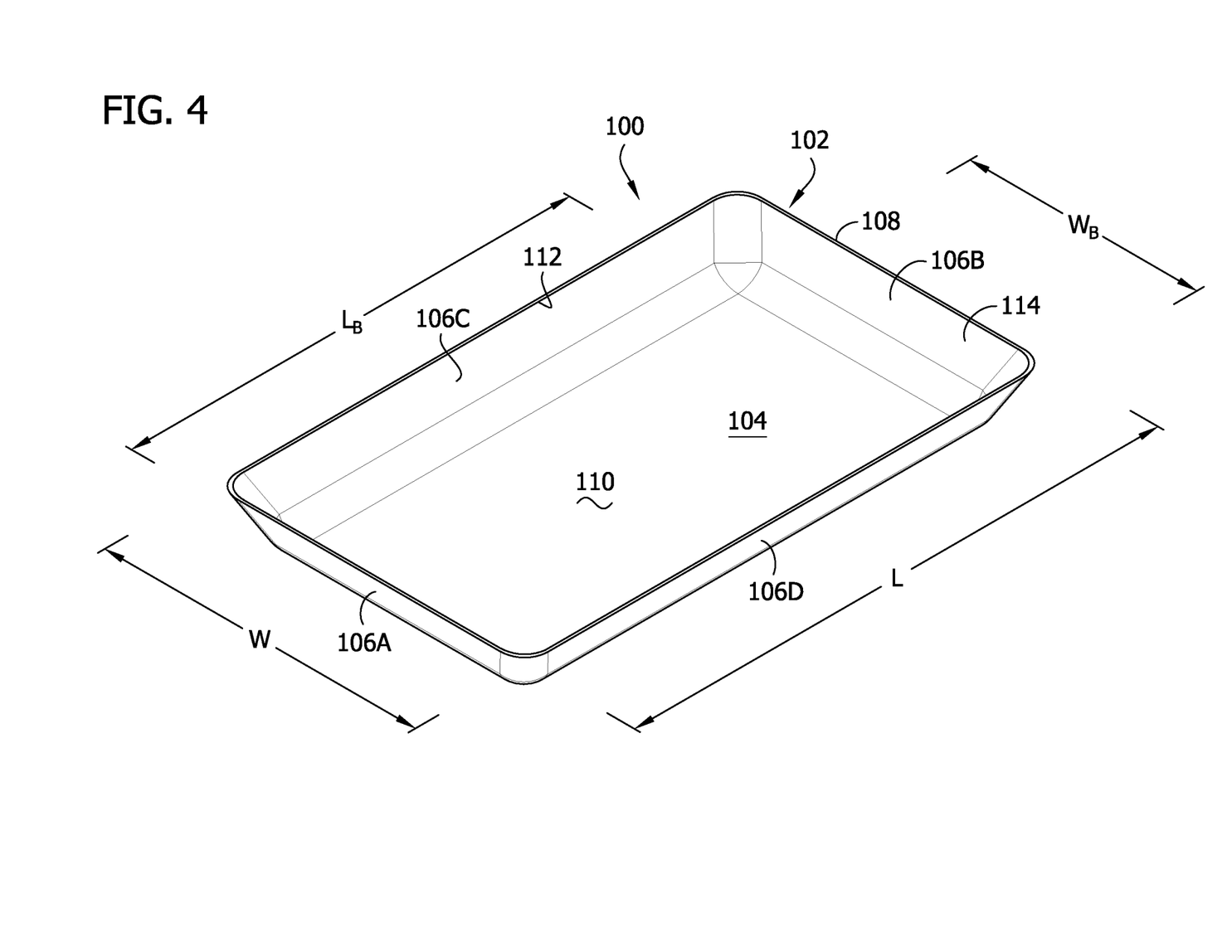
FIG. 4 is a perspective of a liner according to one embodiment of the present disclosure.
Figure 5:
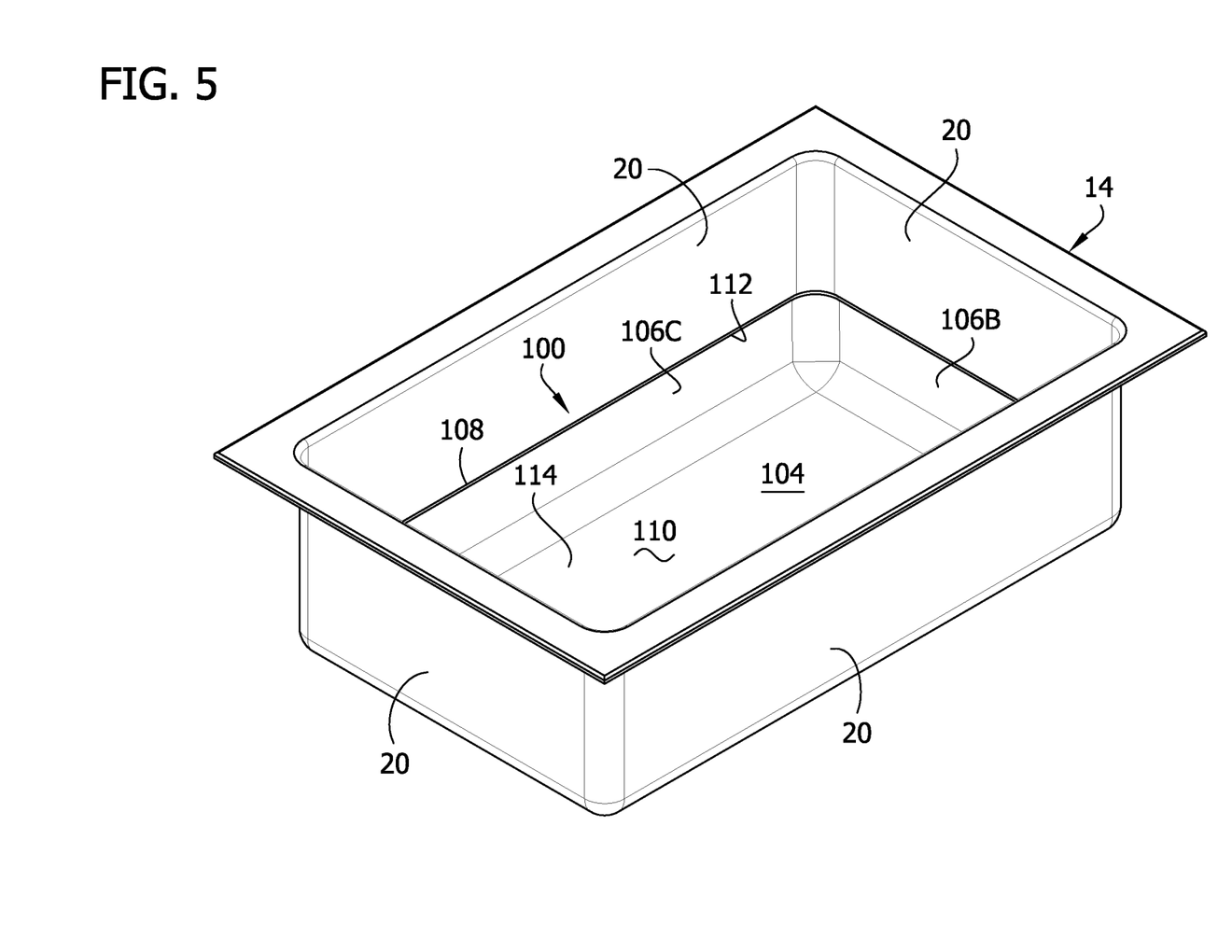
FIG. 5 is a perspective of the liner in the food receiver pan.

Referring to FIGS. 4 and 5, a liner according to one embodiment of the present disclosure is generally indicated by reference numeral 100. The illustrated liner 100 is designed for use with the food tray receivers 12 of the food holding apparatus 10 of FIGS. 1-3, however it is understood the liner can be designed for use with other food receivers. The liner 100 is sized and shaped to fit in the food receiver cavity 16 of the food receiver 12 and engage the food receiver side walls 20 of the food receiver. When disposed in the food receiver 12, the liner 100 rests on the floor 18 of the food receiver and generally forms a seal (e.g., a perimeter seal), such as a liquid tight or food tight seal, with the food receiver side walls 20 and corners of the food receiver. Desirably, the liner 100 seals against all of the food receiver side walls 20 (e.g., the front, rear, left, and right side walls) and the corners defined by the food receiver side walls to form a complete perimeter or peripheral seal around the food receiver cavity 16. However, it will be understood that sometimes a perfect fit may not be achieved, resulting in peripheral seal segments extending along one or more of the food receiver side walls 20 and/or corners with one or more gaps between the peripheral seal segments. No matter whether a complete peripheral seal is made, desirably the liner helps prevent most/all food (solids and/or liquids) from moving (e.g., flowing, falling) in-between the liner 100 and the food receiver side walls 20 of the food receiver 12. Food or liquid that falls into the food receiver cavity 16 of the food receiver 12 (e.g., food that spills out of the tray of food when the tray is being inserted into or removed from the food receiver cavity) is collected by the liner. The liner 100 can then be easily removed from the food receiver 12 (e.g., food receiver cavity 16) for easy cleaning. When the food receiver 12 is used with the liner 100, the food receiver will usually be used in a "dry" fashion without holding a bath of water to facilitate the heating and/or cooling of the food receiver. As known in the art, food receivers 12 may sometimes be filled with a bath of water to provide "wet" heat to the trays of food (e.g., heating the water bath which in turn heats the trays of food) or left empty to provide "dry" heat to trays of food (e.g., heating the trays of food without a water bath).

The liner 100 includes a flexible body 102 sized and shaped to be inserted into the food receiver cavity 16 of the food receiver 12. The flexible body 102 has a generally rectangular shape, to correspond to (e.g., match) the generally rectangular cross-sectional shape of the food receiver cavity 16. It is understood the flexible body 102 can have other shapes to correspond to other shapes of food receiver cavities. The flexible body 102 includes a liner base 104 (e.g., liner lower wall or liner floor) and a plurality of side walls 106 extending generally upward from the base. The base 104 is generally planar (when the entirety of the base is supported by a planar surface). The base 104 is generally rectangular with opposite left and right side edge margins and opposite forward and rear side edge margins. In the illustrated embodiment, the side walls 106 include four side walls, opposite front and rear side walls 106A, 106B and opposite left and right side walls 106C, 106D. The front side wall 106A extends from the front side edge margin of the base 104, the rear side wall 106B extends from the rear side edge margin of the base, the left side wall 106C extends from the left side edge margin of the base, and the right side wall 106D extends from the right side edge margin of the base. The front, rear, left and right side walls 106 are coupled together at corners of the flexible body 102. In the illustrated embodiment, the corners are rounded to correspond to the rounded corners of the food receiver cavity 16 of the food receiver 12. Together, the side walls 106 (e.g., upper edge margins thereof) define a continuous, unbroken rim 108 (e.g., upper edge margin) of the flexible body 102. The size and shape of the rim 108 generally corresponds to the size and shape of the cross-sectional perimeter of the food receiver cavity 16. In the illustrated embodiment, each side wall 106 includes a lower section that extends from the base 104 and curves generally upward to a planar upper section of the side wall.

Each side wall 106 tapers outward, as the side wall extends generally upward from the base 104 toward the open top 112 of the food receiving cavity 110. That is, as the front and rear side walls 106A, 106B extend generally upward away from the base 104, the front and rear side walls taper outward, away from each other. Likewise, as the left and right side walls 106C, 106D extend generally upward away from the base 104, the left and right side walls taper outward, away from each other. Thus, each side wall 106 extends at a skew angle with respect to vertical. As explained in more detail below, the tapering of the side walls 106 facilitates the movement of the side walls toward the food receiver side walls 20 to form the seal between the liner 100 and the food receiver 12.

The flexible body 102 has a food receiving cavity 110. The food receiving cavity 110 is defined by the base 104 and the side walls 106. The food receiving cavity 110 is configured to receive, collect and hold food that may fall into to the food receiver cavity 16 while the food holding apparatus 10 is in use. The food receiving cavity 110 has an open top or mouth 112 at the upper end of the flexible body 102. The open top 112 is configured to receive food when the liner 100 is disposed in the food receiver 12 and food falls into the food receiver cavity 16, toward the liner. When the liner 100 is positioned in the food receiver 12, the open top 112 catches food, or more particularly desirably catches all the food, that falls into the food receiver. The open top 112 is longer, wider, and larger (e.g., length×width, area) than the base 104. The flexible body 102 includes an interior surface 114 that defines the food receiving cavity 110. The interior surface 114 is defined by (e.g., extends over) the base 104 and the side walls 106. Desirably, the interior surface 114 is free of any crevices and/or sharp corners to facilitate cleaning the liner 100. The lack of crevices and/or sharp corners makes the liner 100 easy to clean.

The flexible body 102 comprises (e.g., is partially or entirely formed of) a flexible material, such as silicone or other suitable materials. Desirably, the flexible body 102 is a unitary, one-piece component. For example, the flexible body 102 can be made entirely of silicone or reinforced silicone (e.g., having fiberglass reinforcement therein). Silicone also has the added benefit of being easy to clean, as it has a relatively non-stick surface. In other embodiments, the flexible body may be made of multiple pieces joined together. It will be understood that the flexible body may be a composite structure or otherwise include some relatively rigid portions and other non-rigid or flexible portions.

The flexible body 102 is sufficiently flexible to permit deformation of the flexible body (e.g., deformation of the base 104 and the side walls 106). Desirably, the flexible body 102 is sufficiently flexible to be deformed when the liner 100 is in the food receiver cavity 16. For example, the base 104 may generally conform to the shape of the floor 18 of the food receiver 12 when the liner 100 is placed in the food receiver cavity 16 and supported by the floor. The flexible body is desirably also sufficiently robust to maintain its shape as shown in FIG. 4, when the flexible body is at rest with the entirety of the base 104 supported by a planar support surface (not shown). As illustrated, when the base is entirely supported by the planar support surface, the base is generally planar. The thickness of the material used to form the flexible body 102, the shape of the flexible body, and/or the traits of the material used to form the flexible body, can be chosen or designed to provide the features of the flexible body described herein. For example, in one embodiment, the flexible body 102 has (e.g., the base 104 and the side walls 106 each have) a thickness of about 3/32 inch. This thickness provides the necessary robustness for a flexible body 102 made of silicone such that the side walls 106 do not wilt, ripple, or ruffle when the side walls 106 form the seal with the food receiver side walls 20, as explained in more detail below. In other words, this robustness allows the side walls 106 to lay generally flat against the food receiver side walls 20 when the liner 100 is placed in the food receiver 12. Smaller thicknesses may not provide the necessary robustness, thereby causing the side walls 106 to ripple or ruffle against the food receiver side walls 20, substantially reducing the quality of the seal formed between the liner 100 and the food receiver 12. The flexible body 102 is desirably also resilient (e.g., resiliently deformable) such that if the flexible body were deformed, such as by slightly deforming by pushing in one of the side walls 106, the flexible body would resiliently return to its original shape (see FIG. 4).

The flexible body 102 has a length L and a width W. The length L is measured between the upper edges of the front and rear side walls 106A, 106B (broadly, two opposing side walls) and the width W is measured between the upper edges of the left and right side walls 106C, 106D (broadly, another two opposing side walls). In other words, the length L and the width W of the flexible body 102 is measured at the rim 108. Desirably, the length L of the flexible body 102 is less than a length $L_C$ of the food receiver cavity 16 and the width W of the flexible body is less than a width $W_C$ of the food receiver cavity (when the flexible body 102 is at rest and the entirely of the base is supported by a planar surface). For example, in one embodiment, the length L and the width W of the flexible body are each about 1/8 inch less than the respective length $L_C$ and width $W_C$ of the food receiver cavity 16. The base 104 has a base length $L_B$ and a base width $W_B$. The base length $L_B$ is less than the length L of the flexible body 102 and the base width $W_B$ is less than width W of the flexible body. Therefore, the base length $L_B$ is less than the length $L_C$ of the food receiver cavity 16 and the base width $W_B$ is less than width $W_C$ of the food receiver cavity. Desirably, the base length $L_B$ is greater than a raised portion length $L_R$ of the raised portion 22 of the floor 18 of the food receiver 12 and the base width $W_B$ is greater than a raised portion width $W_R$ of the raised portion of the floor of the food receiver. As will become apparent, these dimensions of the flexible body 102 facilitate the formation of the seal between the liner 100 and the food receiver 12. Flexible bodies having other configurations than described and illustrated herein can be used without departing from the scope of the present disclosure.

Figure 6:
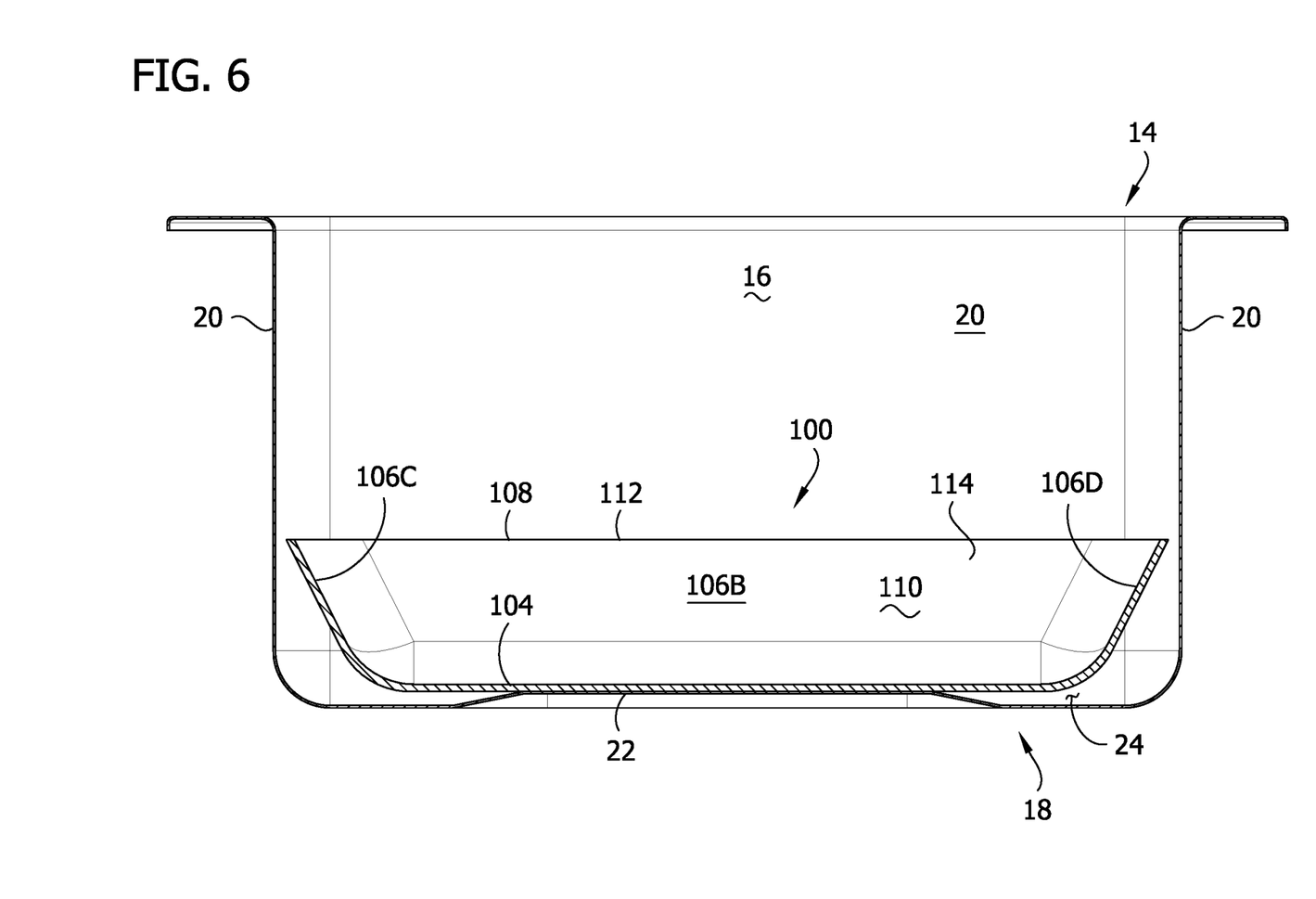
FIG. 6 is a cross section of the liner in the food receiver pan before the liner deforms to form a seal with the food receiver pan.
Figure 7:
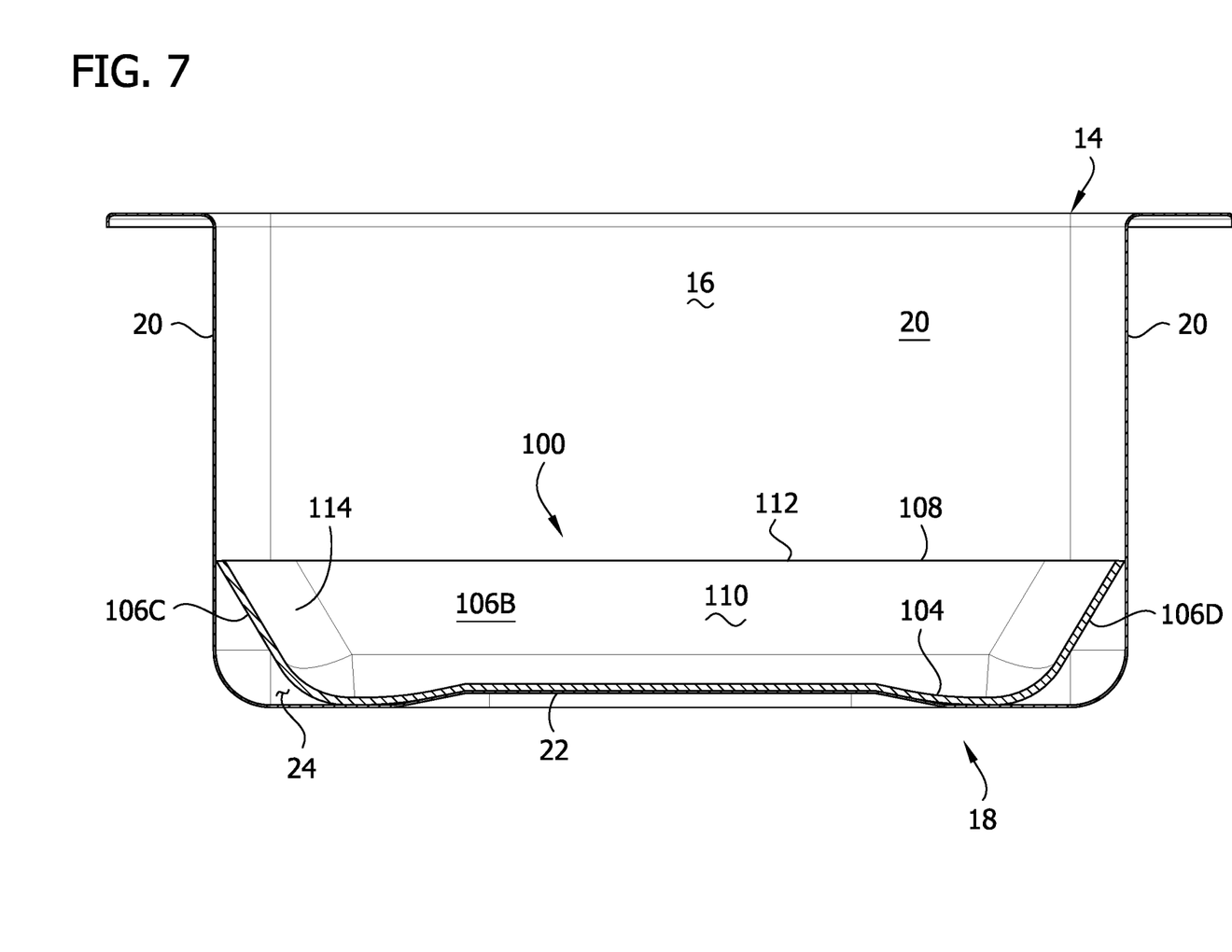
FIG. 7 is a cross section of the liner in the food receiver pan after the liner has deformed to form the seal with the food receiver pan.

Referring to FIGS. 6 and 7, the flexible body 102 is configured to engage and form a seal with the food receiver 12 to collect generally all the food that may fall into the food receiver cavity 16. The side walls 106 are configured to move into engagement with the food receiver side walls 20 to generally prevent food from moving between the food receiver side walls and the sidewalls of the flexible body 102 when the flexible body is disposed in the food receiver cavity 16 of the food receiver 12. In particular, the side walls 106 form a seal with the food receiver side walls 10. Desirably, the rim 108 (e.g., upper edge margins of the side walls 106) engages and forms the seal with the food receiver side walls 20. The seal formed between the side walls 106 and the food receiver side walls 20 ensures the food will fall into the food receiving cavity 110 of the flexible body 102. Desirably, the side walls 106 (e.g., rim 108) form a complete perimeter seal around the food receiving cavity 16 with the food receiver side walls 20. However, it will be understood that sometimes a perfect fit may not be achieved between the side walls 106 of the liner 100 and the food receiver side walls 20, resulting in peripheral seal segments between the side walls and food receiver 12 with one or more gaps between the peripheral seal segments. Regardless of whether a complete or partial peripheral seal is made, the engagement between the side walls 106 of the flexible body 102 and the food receiver side walls 20 prevents most/all food from moving in-between the liner 100 and the food receiver 12 and collecting on the floor 18 of the food receiver.

As mentioned above, the length L and the width W of the flexible body 102 (e.g., the rim 108) is desirably less than the length $L_C$ and the width $W_C$ of the food receiver cavity 16, respectively. Accordingly, as generally shown in FIG. 6, at least some of the side walls 106 would be spaced apart from corresponding food receiver side walls 20 of the flexible body 102 stayed in the configuration shown in FIG. 6. Thus, to form the seal (e.g., continuous peripheral seal) between the flexible body 102 and the food receiver side walls 20, the side walls 106 move outward (e.g., sag) to engage the food receiver side walls and form the seal when the liner 100 is disposed (e.g., positioned or placed) in the food receiver cavity 16. To facilitate the movement of the side walls 106 toward (e.g., into engagement with) the food receiver side walls 20, the base 104 of the flexible body 102 is configured to be deformed by the raised portion 22 of the floor 18 of the food receiver 12. When the liner 100 is disposed (e.g., placed) in the food receiver cavity 16, the base 104 of the flexible body 102 generally conforms to the contours of the floor 18 (e.g., deforms around the raised portion 22). Specifically, the base 104 is deformed by the raised portion 22 of the floor 18. The base 104 (e.g., a center portion thereof) contacts and is supported by the raised portion 22 of the floor 18 of the food receiver 12. As a result, because the base 104 is larger (e.g., length, width) than the raised portion 22, an outer peripheral section of the base is unsupported by the raised portion of the floor 18. Due to the flexibility of the base 104 and the effects of gravity, this unsupported outer peripheral section of the base falls or sags downward into the perimeter recess 24 of the floor 18. Due to this deformation of the base 104 around the raised portion 22 of the floor 18 of the food receiver 12, the side walls 106 move outward toward and into engagement with the food receiver side walls 20, as shown in FIG. 7. The deformation of the base 104 increases the skew angle (relative to the vertical) of the side walls 106 thereby moving the side walls outward. The outward movement of the side walls 106 is further facilitated by the outward tapering (e.g., outward skew angle) of the side walls, causing the side walls to fall or sag outward. The outward tapering of the side walls results in the upper edge margins of the side walls naturally tending to move outward, due to the center of gravity of each side wall being disposed laterally outboard of the base 104. This natural tendency for the side walls 106 to move outward results in the side walls moving outward when the base 104 deforms over the raised portion 22 of the floor 18. This outward movement biases the rim 108 (e.g., the upper edge margins of each side wall 106) toward sealing engagement with the inner surfaces of the food receiver side walls 20. Accordingly, when the liner 100 is in the food receiver cavity 16, the side walls 106 move outward into sealing engagement with the food receiver 12. This sealing configuration is shown in FIG. 7. As illustrated, in this embodiment, the seal between the flexible body 102 and the food receiver 12 is generally formed around the rim 108 of the liner 100 (e.g., the upper edge margins of the side walls 106).

When the liner 100 is in the sealing configuration, as shown in FIG. 7, the base 104 of the liner rests on the floor 18 of the food receiver 12. The base 104 rests on the raised portion 22 and sags into the perimeter recess 24. In the illustrated embodiment, the base 104 is shown resting on the portion of the floor 18 defining the bottom of the perimeter recess 24. It will be appreciated that the base 104 of the liner 100, although deformed and falling into the perimeter recess 24, may remain spaced above the portion of the floor 18 defining the bottom of the perimeter recess due to the rim 108 of the flexible body 102 engaging the food receiver side walls 20. The base 104 of the liner 100 may continually seek to sag farther downward into the perimeter recess 24, such that the rim 108 of the flexible body 102 is continually biased against the food receiver side walls 20 to maintain and form a more robust sealing engagement (e.g., seal) between the liner and the food receiver 12.

In the sealing configuration, desirably a continuous perimeter seal around the entire rim 108 of the flexible body 102 is formed with the food receiver 12 to prevent food (e.g., solids and liquids) from passing therebetween. Therefore, any food that falls into the food receiver 12, falls into and is collected by the liner 100. This makes it easier to clean the food receiver, by simply removing the liner 100 and any food collected thereby from the food receiver. This also prevents the food from falling into the food receiver 12 and resting on the floor 18 of the food receiver. Any food resting on the floor 18 may burn and/or become stuck to the floor. The liner 100 prevents this from happening. Moreover, the non-stick surface of the liner 100 makes it easier to clean should any food collected by the liner be burned by the heating element of the food receiver 12. Also, the flexibility of the liner facilitates manual deformation of the liner to break food away from the liner.

The movement of the side walls 106 and the formation of the perimeter seal between the liner 100 and the food receiver 12 may be further facilitated by the heating of the food receiver (to heat the food held in the trays), which in turn heats the flexible body 102, making it easier for the flexible body to deform. For example, when the liner 100 is first installed in the food receiver 12, there may be one or more gaps between the rim 108 of the flexible body 102 and the food receiver side walls 20, such as at the corners of the liner and food receiver cavity 16. But after the liner 100 is heated, the liner may expand and/or further deform and close the gaps.

It has been found that configuring the liner 100 to provide the tapering and outward movement of the side walls 106 to form the seal is more desirable compared to a liner having a rim and/or side walls that closely conform to or directly match the size and shape of the food receiver cavity 16 because such a liner may not form a sufficient seal. Instead, what tends to occur with directly matched liners is that their walls tend to ripple or get wavy when engaged with the food receiver side walls 20, preventing the formation of the continuous perimeter seal.

Testing has shown the liner 100 provides an insulative effect to the food receiver cavity 16. Although heat from a heat source or heater (e.g., a heating element and optional heat distribution, such as an aluminum plate) below the floor 18 of the food receiver 12 may need to pass upward through the liner 100 to heat the air in the food receiver cavity 16 about the liner, the liner does not significantly block transmission of the concentrated heat emanating from the heater into the food receiver cavity. In fact, any insulative effect by the liner 100 is easily overcome due to the continued heating provided by the heater, which heats the liner to generally the same desired temperature of the air in the food receiver cavity 16. The liner 100 may also serve to insulate the heated air in the food receiver cavity 16 and prevent transmission of heat downward and laterally out of the food receiver cavity (e.g., via passing through the metal walls and floor 18 of the food receiver pan 14 covered by the liner).

Other configurations of the liner can be used without departing from the scope of the present disclosure. For example, the liner can have taller side walls. In another example, the side walls of the liner may not be coupled together at the corners of the liner.

When introducing elements of aspects of the disclosure or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that several advantages of the aspects of the disclosure are achieved and other advantageous results attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the aspects of the disclosure by way of example and not by way of limitation. This description enables one skilled in the art to make and use the aspects of the disclosure, and describes several embodiments, adaptations, variations, alternatives and uses of the aspects of the disclosure, including what is presently believed to be the best mode of carrying out the aspects of the disclosure. Additionally, it is to be understood that the aspects of the disclosure is not limited in its application to the details of construction and the arrangement of components set forth in the description or illustrated in the drawings. The aspects of the disclosure are capable of other embodiments and of being practiced or carried out in various ways. Also, it will be understood that the phraseology and terminology used herein is for the purpose of description and should not be regarded as limiting.

Having described aspects of the disclosure in detail, it will be apparent that modifications and variations are possible without departing from the scope of aspects of the disclosure as defined in the appended claims. It is contemplated that various changes could be made in the above constructions, products, and methods without departing from the scope of aspects of the disclosure. In the preceding specification, various embodiments have been described with reference to the accompanying drawings. It will, however, be evident that various modifications and changes may be made thereto, and additional embodiments may be implemented, without departing from the broader scope of the aspects of the disclosure as set forth in the claims that follow. The specification and drawings are accordingly to be regarded in an illustrative rather than restrictive sense.

What is claimed is:

1. A food holding assembly comprising:
   a food holding apparatus including a food tray receiver, the food tray receiver having a plurality of food tray receiver side walls defining a food tray receiver cavity sized and shaped to receive one or more trays of food; and
   a liner sized and shaped to be inserted into the food tray receiver cavity of the food tray receiver, the liner having a base and a plurality of liner side walls extending generally upward from the base, the liner having a food receiving cavity defined by the base and the plurality of liner side walls, the food receiving cavity having an open top arranged to receive food when the liner is disposed in the food tray receiver and food falls toward the liner, the liner side walls configured to move into engagement with the food tray receiver side walls to generally prevent food from moving between the food tray receiver side walls and the liner side walls when the liner is disposed in the food tray receiver cavity of the food tray receiver,
   wherein the food tray receiver includes a floor having a raised portion, wherein the base is configured to be deformed by the raised portion of the floor to facilitate the movement of the plurality of liner side walls into engagement with the food tray receiver side walls when the liner is disposed in the food tray receiver cavity of the food tray receiver.

2. The food holding assembly of claim 1, wherein the liner side walls are configured to form a seal with the food tray receiver side walls.

3. The food holding assembly of claim 2, wherein the liner side walls are configured to form a complete perimeter seal around the food receiving cavity with the food tray receiver side walls.

4. The food holding assembly of claim 1, wherein the liner includes a rim, the rim formed by upper edges of the plurality of liner side walls, the rim being configured to move into engagement with and form a seal with interior surfaces of the food tray receiver side walls to generally prevent food from moving between the food tray receiver side walls and the rim of the liner when the liner is disposed in the food tray receiver cavity of the food tray receiver, the interior surfaces of the food tray receiver side walls bounding the food tray receiver cavity.

5. The food holding assembly of claim 1, wherein the liner has a length and a width, the length measured between upper edges of two opposing liner side walls of the plurality of liner side walls and the width measured between upper edges of two other opposing liner side walls of the plurality of liner side walls, and
   wherein the length of the liner being less than a length of the food tray receiver cavity when the liner is at rest outside the food tray receiver cavity and the entirety of the base is supported by a planar surface, or the width of the liner being less than a width of the food receiver cavity when the liner is at rest outside the food tray receiver cavity and the entirety of the base is supported by the planar surface.

6. The food holding assembly of claim 1, wherein the liner has a length and a width, the length measured between upper edges of two opposing liner side walls of the plurality of liner side walls and the width measured between upper edges of two other opposing liner side walls of the plurality of liner side walls, wherein the base has a base length and a base width, the base length being less than the length of the liner and the base width being less than the width of the liner.

7. The food holding assembly of claim 1, wherein the base includes opposite front and rear side edge margins and opposite left and right side edge margins, the plurality of liner side walls including a front side wall extending from the front edge margin of the base, a rear side wall extending from the rear side edge margin of the base, a left side wall extending from the left side edge margin of the base, and a right side wall extending from the right side edge margin of the base.

8. The food holding assembly of claim 1, wherein the liner is a unitary, one-piece component.

9. The food holding assembly of claim 1, wherein the liner comprises silicone.

10. The food holding assembly of claim 1, wherein the base and the plurality of liner side walls each comprise silicone that is about 3/32 inch thick.

11. The food holding assembly of claim 1, wherein the base has a base length and a base width and the raised portion has a raised portion length and a raised portion width, the base length being greater than the raised portion length and the base width being greater than the raised portion width.

12. The food holding assembly of claim 1, wherein the liner includes an interior surface defining the cavity, the interior surface defined by the base and the plurality of liner side walls, the interior surface being free of any crevices and sharp corners.

13. A food holding assembly comprising:
    a food holding apparatus including a food tray receiver, the food tray receiver having a plurality of food tray receiver side walls defining a food tray receiver cavity sized and shaped to receive one or more trays of food; and
    a liner sized and shaped to be inserted into the food tray receiver cavity of the food tray receiver, the liner having a base and a plurality of liner side walls extending generally upward from the base, the flexible liner having a food receiving cavity defined by the base and the plurality of liner side walls, the food receiving cavity having an open top arranged to receive food when the liner is disposed in the food tray receiver and food falls toward the liner, the liner side walls configured to engage the food tray receiver side walls when received in the food tray receiver cavity to obstruct food from moving between the food tray receiver side walls and the liner side walls, wherein the liner side walls taper outward as the liner side walls extend generally upward away from the base;

wherein the food tray receiver includes a floor having a raised portion, and wherein the base of the liner is configured to be deformed by the raised portion of the floor of the food tray receiver to facilitate movement of the plurality of liner side walls into engagement with the food tray receiver side walls.

14. The food holding assembly of claim 13, wherein the liner side walls are configured to form a seal with the food tray receiver side walls.

15. The food holding assembly of claim 14, wherein the liner side walls are configured to form a complete perimeter seal around the food receiving cavity with the food tray receiver side walls.

16. The food holding assembly of claim 13, wherein the liner includes a rim, the rim defined by upper edge margins of the plurality of liner side walls, the rim being configured to move into engagement with and form a seal with interior surfaces of the food tray receiver side walls to generally prevent food from moving between the food tray receiver side walls and the rim of the liner when the liner is disposed in the food tray receiver cavity of the food tray receiver, the interior surfaces of the food tray receiver side walls bounding the food tray receiver cavity.

17. The food holding assembly of claim 13, wherein the liner is constructed to permit gravity acting on the liner side walls to bias the side walls against respective food tray receiver side walls when the liner is in the food tray receiver.

18. The food holding assembly of claim 1, wherein the liner comprises a flexible body forming the plurality of liner side walls.

19. The food holding assembly of claim 1, wherein the food tray receiver includes a food conditioning element arranged to condition a temperature of the one or more food trays received in the food tray receiver.

20. The food holding assembly of claim 19, wherein the food conditioning element comprises an electrical resistance heating element.

21. The food holding assembly of claim 20, wherein the electrical resistance heating element is arranged to heat the liner, and wherein the liner side walls are configured to deform when heated by the electrical resistance heating element to facilitate the movement of the plurality of liner side walls into engagement with the food tray receiver side walls.

22. The food holding assembly of claim 1, wherein a height of the liner is less than half a height of the food tray receiver cavity.

23. The food holding assembly of claim 1, wherein the food tray receiver includes a perimeter trough extending around the raised portion, between the raised portion and the food tray receiver side walls.

24. The food holding assembly of claim 18, wherein the flexible body is deformable by the force of gravity acting on the flexible body.

25. The food holding assembly of claim 1, wherein the liner consists of silicone.

* * * * *